April 13, 1937.  M. H. GRAHAM  2,076,774

HEAT REGULATING TIMER FOR TOASTERS AND OTHER HEAT APPLIANCES

Filed May 6, 1935  3 Sheets-Sheet 1

INVENTOR
Maurice H. Graham
By His Attorneys

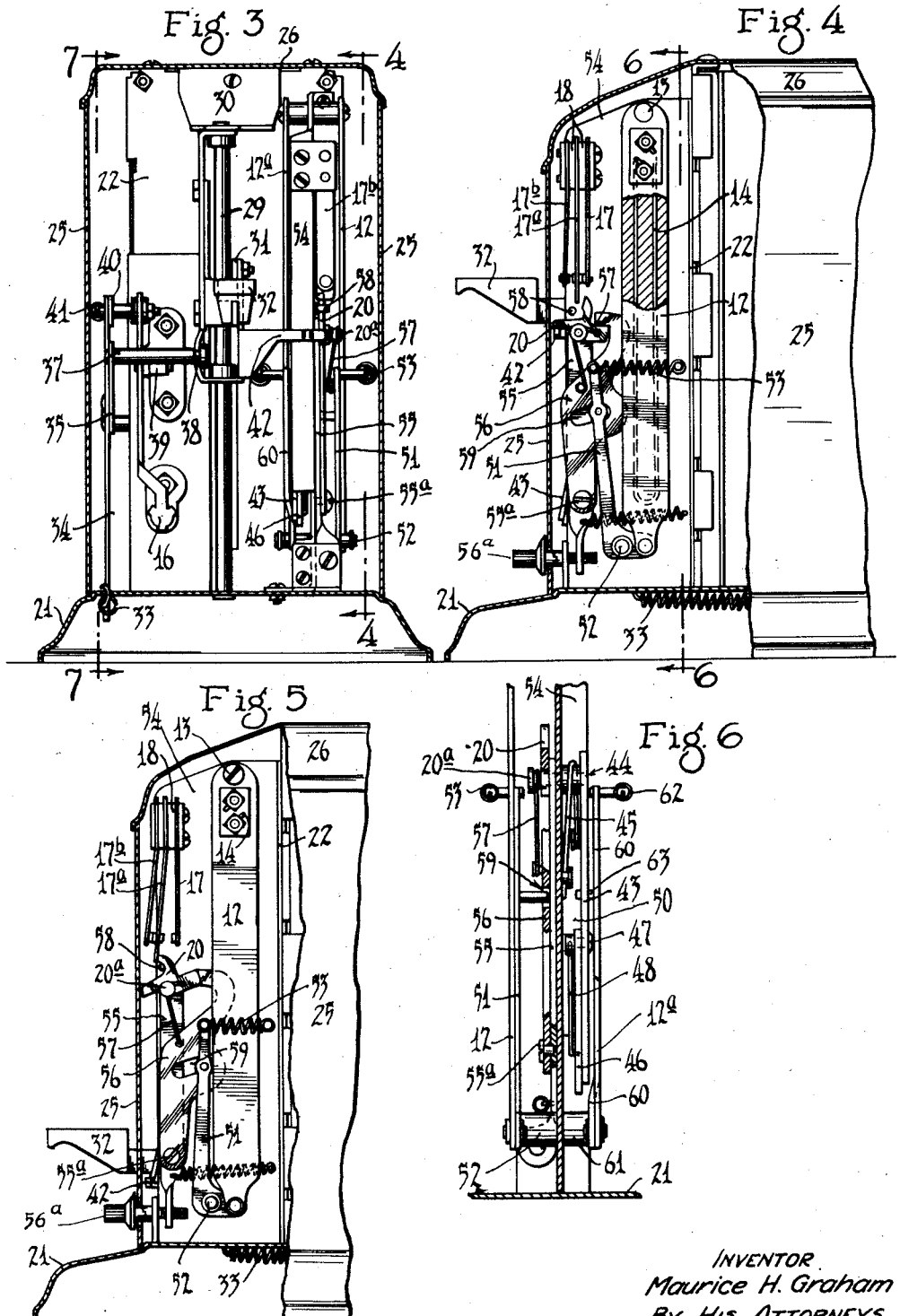

April 13, 1937.   M. H. GRAHAM   2,076,774
HEAT REGULATING TIMER FOR TOASTERS AND OTHER HEAT APPLIANCES
Filed May 6, 1935   3 Sheets-Sheet 3

INVENTOR
Maurice H. Graham
BY HIS ATTORNEYS

Patented Apr. 13, 1937

2,076,774

UNITED STATES PATENT OFFICE 2,076,774

HEAT REGULATING TIMER FOR TOASTERS AND OTHER HEAT APPLIANCES

Maurice H. Graham, St. Louis Park, Minn.

Application May 6, 1935, Serial No. 19,947

24 Claims. (Cl. 219—19)

My present invention relates to heat regulating timers. As illustrated in the drawings and described in the following specification, this invention is applied as the automatic timing mechanism of an automatic bread toaster; but the invention is capable of a wide range of application to various other devices including, for example, waffle irons and cookers.

In my pending application Serial No. 4,899, filed February 4, 1935, and entitled "Heat regulating timer for toasters and other heat appliances", I have briefly discussed certain analogous prior art devices, and which, for the purposes of this case, it is not considered necessary to repeat. In my said pending application, when applied to a commercial toaster or cooking device, the timing of the cooking or heating action involves two sub-intervals, to wit: (a) a variable sub-interval required to heat a thermally-responsive timer or member from an uncertain or variable cool or low temperature condition to a predetermined high temperature; plus (b) an invariable or constant sub-interval required to permit the said previously heated thermally responsive timer member to cool from the predetermined high temperature down to a predetermined cool or relatively low temperature.

In accordance with my present invention, however, I employ, as a complete timer, two thermally responsive timer members in an arrangement wherein the timing is performed by a complete interval involving a sub-interval (a) and a sub-interval (b); but in this arrangement, the sub-interval (a) is the time required to heat the first or primary thermally responsive timer member from a variable low temperature to a predetermined high temperature, and the sub-interval (b) is the time required to heat the secondary thermally responsive timer member from a relatively low temperature to a predetermined relatively higher temperature. In the application of this invention to an electrically operated toaster, for example, the coils or heating elements of the primary and secondary thermally responsive timers are connected to the heating coils or elements of the toaster through a switch, which, under co-operating control mechanism, will, when the circuit is closed through the toaster heating elements, close the circuit first through the coil or heating element of the primary timer member and later through the coil or heating element of the secondary timer member. In practice, it has been found practically impossible to obtain a time interval of more than one and one-half minutes (1½) with a single reliable thermally responsive member, whereas, in practice, a cooking interval for the toasting of bread will frequently require as much as three (3) minutes. By my improved arrangement wherein the sub-intervals (a) and (b) are performed by the successive expansion of the two thermally responsive members operating in the same complete cooking or toasting interval a toasting interval of the required length is obtained. Moreover, both of the sub-intervals (a) and (b) which make up the total interval are subject to the same voltage change so that the complete interval will be automatically varied with voltage and the same toasting or cooking action will be produced whether the voltage is, for example, 90 or 120 volts. Obviously, the actual time interval will be somewhat shorter under 120 volts than under 90 volts, but the cooking or toasting action produced will be the same regardless of the slight variation in actual time interval.

In the accompanying drawings, which illustrate the invention embodied in a bread toaster, like characters indicate like parts throughout the several views.

Referring to the drawings:

Fig. 3 is a transverse vertical section taken on the line 3—3 of Fig. 2;

Fig. 4 is a front to rear vertical section taken on the line 4—4 of Fig. 3, some parts being broken away and some parts being shown in full;

Fig. 5 is a view corresponding to Fig. 4, but illustrating different positions of certain of the parts;

Fig. 6 is a fragmentary transverse section taken on the line 6—6 of Fig. 4;

Figure 9:
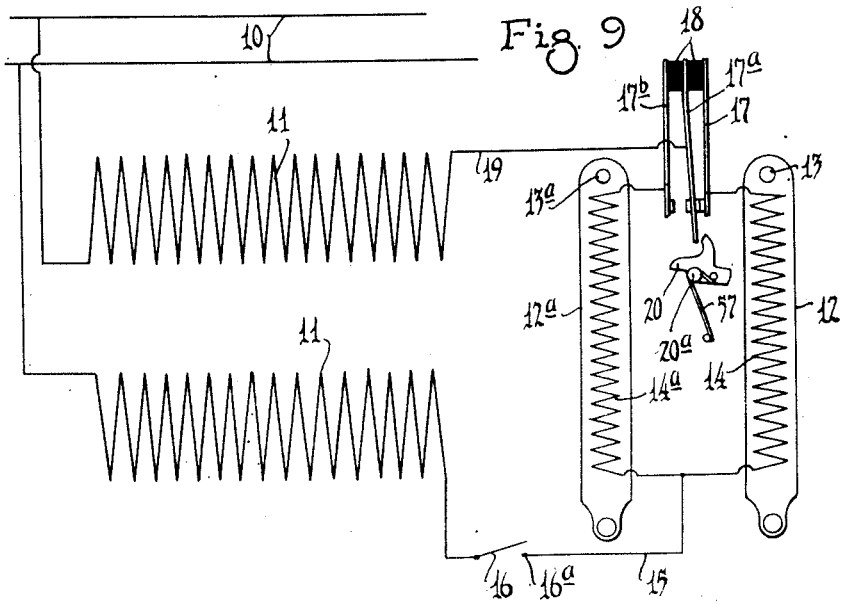
Fig. 9 is a diagrammatic view illustrating the wiring of the electrical elements of the device.

Before describing in detail the manner in which the invention is incorporated in a toaster, it is thought desirable to first consider the general arrangement of the electrical elements of the device insofar as indicated in Fig. 9. Referring to this view, the numeral 10 indicates the supply wires that are connected to the main heating coils or electrical radiators, which latter, when incorporated in the toaster, supply the bread-toasting heat. The primary thermally responsive member of the thermally responsive timer is indicated by the numeral 12 and the secondary timer element is indicated at 12a. These members 12 and 12a may take various forms, but are preferably in the form of flat metal bars of a suitable metal such as aluminum, said elements being anchored respectively at 13 and 13a. Closely associated or incorporated in the members 12 and 12a, respectively, are electrical heating coils 14 and 14a, one of the heating coils 11 by wire 15 is connected to both coils 14 and 14a. A master switch 16—16a is interposed in the wire or lead 15.

The control of the flow of current through the coils 14 and 14a of the thermally responsive timer is controlled by a selector or timer switch which may take various forms, but as shown, is made up of three contact bars 17, 17a and 17b, insulated from each other by blocks or spacers 18. The coils 14 and 14a are connected, respectively, to the switch contacts 17 and 17b, while the heating coil 11 to which the wire 15 is not directly connected is by a wire 19 connected to the intermediate and movable switch contact 17a. The tension in the contact bar 17a is such that it will normally make electrical engagement with the contact 17; and under these conditions, it will be noted that the flow of current will be through both the heating coils 11 and through the timer coil 14, but not through the timer coil 14a. When, however, contact 17 is moved out of engagement with contact 17a and into engagement with contact 17b, the current will then flow through both of the heating coils 11 and through the timer coil 14a, but not then through the timer coil 14. Both of the statements just above made assume that the master switch 16—16a is then closed. The numeral 20 indicates an oscillatory tappet pivoted at 20a which, when in position shown in Fig. 9, allows contact 17a to engage contact 17, but when oscillated in a counterclockwise direction, will move said contact 17a out of engagement with contact 17 and into engagement with contact 17b.

With the above preliminary description made, the manner in which the invention is incorporated in a commercial toaster will now be described.

In this embodiment of my invention, the toaster has very much the appearance of that of the well known "Toastmaster" toaster, but differs therefrom very materially in its vital structural features and operation. As here illustrated, the base portion of the toaster is made up of a raised plate 21. Rigidly secured on and rising from this base plate 21 is a frame made up of upright front and rear plates 22 and 23 that support laterally spaced insulating sheets 24 preferably of mica, and on which latter the heating coils 11 are applied. Detachably mounted on the base plate 21 and surrounding and enclosing the mica sheets 24 and other parts, is a casing 25 preferably of light sheet metal and on the top of which is a crown sheet or top plate 26. The crown sheet 26 is provided with a centrally located bread discharge passage 27 through which, as will presently appear, the bread slice may be passed into and out of the oven or toasting chamber formed between the coils 11.

Mounted to move vertically between the heating elements or coils 11 is a bread-supporting carrier 28 that is suitably guided for true vertical movements by the usual or any suitable means, but including a vertical guide post 29 rigidly secured to the base 21 and to a projection 30 of the front plate 22. The direct connection between the front end of the bread carrier 28 and the post 29 is shown as made by a bracket 31 rigidly secured to the former and slidable upon the latter and provided with a forwardly projecting handle 32.

The carriage or bread carrier 28 is put under spring tension to move from its lowermost to its uppermost or bread-discharging position, by a coiled spring 33, one end of which is adjustably anchored to the base 21 and the other end of which is connected to the lower end of a vertically disposed arm 34 that is rigidly secured to a long lever 35, the rear end of which latter is pivoted to the rear plate 23 at 36. The front end of this long lever 35 has a laterally projecting stud 37, the projecting end of which is connected to the carriage bracket 31 at 38.

Figure 1:
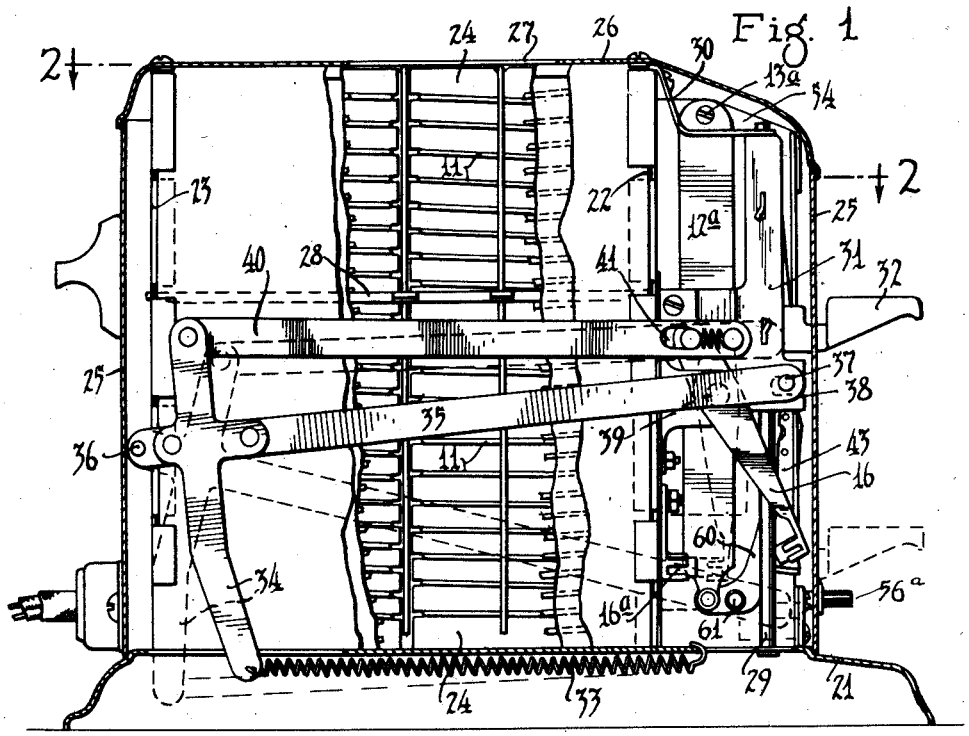
Fig. 1 is a vertical section taken on the line 1—1 of Fig. 2 and illustrating the invention as incorporated in a bread toaster.
Figure 2:
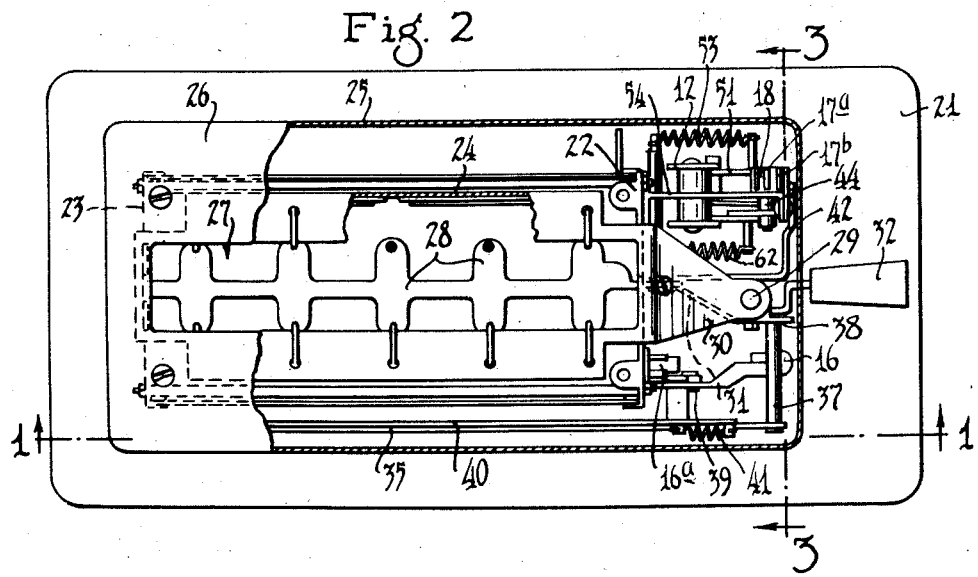
Fig. 2 is a view partly in plan and partly in horizontal section taken on the line 2—2 of Fig. 1.

By reference particularly to Fig. 1, it will be noted that the master switch 16—16a, as shown, comprises a movable contact arm 16 and a fixed contact 16a; that the contact arm 16 is intermediately pivoted at 39 to a projection of the front plate 22, and that the fixed contact 16a is applied to said front plate 22. These switch elements 16 and 16a, except for their circuit connections, are of course, insulated from each other; and as shown, they are provided at their engaging ends with carbon contact points. The upper end of the arm 34 is connected to a forwardly extended switch-actuating link 40, the front end of which is connected to the upper end of the movable switch element 16 by a yielding connection 41 made up of a short coiled tension spring, a connecting stud and a slot, all as best shown in Fig. 1.

Figure 7:
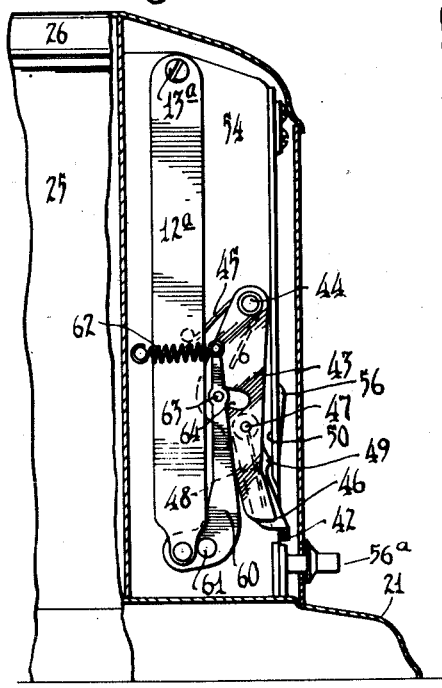
Fig. 7 is a view partly in elevation with some parts broken away, but chiefly in section on the line 7—7 of Fig. 3.
Figure 8:
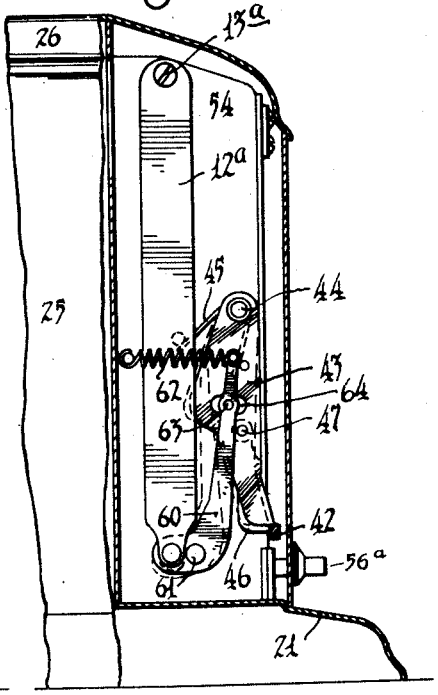
Fig. 8 is a view corresponding to Fig. 7 but illustrating different positions of certain of the parts.

It is important to note that the carrier bracket 31 is provided with a laterally projecting latch finger or element 42, see Figs. 1, 7 and 8, which, when the carrier is forced downward to its limit, will be engaged and held down by a latch device, a preferred form of which is illustrated in Figs. 7 and 8. This latch device, as shown, involves a primary latch dog 43 pivotally supported in the frame structure at 44, subject to a spring 45, which tends to hold the depending free end of said latch dog in position to engage over the carrier latch projection 42.

Under certain conditions hereinafter explained, the primary latch dog 43 may be retracted at a time when the carrier is forced down, and hence to engage the said latch element 42 and hold the carriage depressed at such time, an auxiliary latch dog 46 is provided. This dog 46 is pivoted to the primary dog 43 at 47 and by a spring 48 is yieldingly pressed to the right in respect to Figs. 7 and 8, as far as permitted. At its intermediate portion, the auxiliary latch dog 46 is provided with a fulcrum lug 49 that is engageable with a surface 50 on the front of the frame structure.

The primary thermally responsive bar 12, at its lower end, is pivotally connected to the short arm of a bell crank lever 51 that is pivoted to the fixed frame structure at 52. This lever 51 is yieldingly drawn rearward or toward the right in respect to Figs. 4 and 5, by a light coiled spring 53.

It will now be noted that the three members 17, 17a and 17b of the selecting switch are suitably supported at their upper ends from the upper portion of the upright standard 54, to which also the above noted latch dog 43 is pivotally connected at 44. This standard 54 is rigidly secured from the base 21 and the front plate 22. An adjustable support in the form of a lever 55 is pivoted to the standard 54 at its upper end on the pivot 20a that connects the tappet 20 to standard 54, and at its extreme lower end is adjustably connected, by a hand set screw 57 to a lug 57a on the base 21, see particularly Figs. 3, 4 and 5. It will now be noted that the switch tappet 20 first described in connection with diagram view, Fig. 9, is pivotally mounted on the upper end of this lever-like support 55. Pivotally mounted on the lower end portion of lever 55, at 55a, and rising therefrom is a tappet-releasing lever 56, the curved upper end of which acts upon the tappet 20 in a manner which will presently appear.

A spring 57 connects the tappet to lever 56 and exerts a light force that tends to oscillate the tappet in a counter-clockwise direction into a position shown in Fig. 5, where said tappet is limited in its movement by a stop pin 58 on the member 54. It should now be noted that bell crank 51 is provided with a projecting stud that works in a slot 59 formed in the lever 56.

Attention is now called to the fact that the lower end of the secondary thermally responsive timer member 12a is pivotally connected to the short arm of a bell crank lever 60, that is pivoted at 61 to the standard 54 and is yieldingly drawn rearward or toward the left in respect to Fig. 7 by a light coiled spring 62. Near its upper end lever 60 is provided with a laterally projecting stud 63 that works through a slot 64 in the latch dog 43.

*Operation*

Normally, that is, when the toaster is idle, the parts will be in positions shown best in Figs. 1, 3, 4 and 6, and at this time the master switch 16—16a will be open and the current will be entirely cut off from the toaster. At this time, it is further important to note that the bread carriage or carrier 21 being held in its uppermost position by the action of the spring 33, the carriage projection or latch element 42 will be in engagement with the switch tappet 20 and the latter will be held in the position shown in Figs. 4 and 9 by the latch or dog-acting releasing lever 56, so that current will flow not only through the heating coils 11, but through the coil 14 of the primary thermally responsive member 12 whenever the master switch is thereafter closed by depression of the carriage. When a slice of bread has been inserted through the passage 27 and placed on the carriage 28, the toaster will be thrown into action simply by taking hold of the handle 32 and depressing the carriage to its lowermost position, see Figs. 5 and 8, and note dotted line position of the parts in Fig. 1, by reference to which it will be noted that this downward movement of the carriage closes the master switch 16—16a and causes the primary latch dog 43 to engage the latch projection 42 of the carriage and lock said carriage in its depressed position with the bread slice properly positioned between the coils or heating elements 11. Current will then flow not only through the coils or heat-radiating elements 11, but through the coil 14 of the primary thermally responsive member 12. The toasting action will thus be initiated and the member 12 will be heated and caused to expand. As it expands, see particularly Fig. 4, lever 51 will be oscillated on its pivot 52, and when said member 12 has been heated to a predetermined temperature, lever 51 will move releasing lever 56 to the right in respect to Fig. 4, until it releases switch tappet 20, whereupon the latter, under the action of the spring 57, will be moved to the position shown in Fig. 5, thereby cutting the coil 14 out of circuit and closing the circuit through coil 14a of the secondary thermally responsive member 12a. This action of course, takes place without interrupting the flow of current through the heating coils 11. When secondary thermally responsive member 12a has been heated to a predetermined temperature, the expansion thereof will cause the lever 60 to move from its operative position rearward or toward the left in respect to Figs. 7 and 8 and out of engagement with the latch projection 42 of the carriage, thereby permitting the latter, under the action of the spring 33, to quickly return the carriage to its uppermost position. This upward movement of the carriage, of course, restores the parts to normal positions shown in Figs. 1, 3 and 4, thereby opening the master switch and cutting off a supply of current to the toaster, which, of course, terminates the toasting action. This return of the carriage to its uppermost position, as heretofore indicated, restores the switch tappet 20 to its normal position shown in Figs. 4 and 9, in which position said tappet will be again held by the latch lever or dog 56, with the selector switch set as shown in Fig. 9, to cause flow of current through the coil 14 of the primary timer member 12, as soon as the carriage is again depressed or forced to its extreme lowermost position.

The function of the auxiliary latch dog 46 is as follows: When the secondary timer bar 12a is expanded to or close to its extreme length, lever 60 will hold the primary latch dog 43 retracted, as shown in Fig. 7, and at such time, auxiliary dog 46 is positioned to catch the latch projection 42 of the carriage and hold the carriage locked down with the master switch closed until member 12a is contracted enough to permit primary latch dog 43 to engage over the latch projection 42. As latch dog 43 assumes its operative position, shown in Fig. 8, auxiliary dog 46 will be rocked on its fulcrum 49 into a retracted position. This operation of the auxiliary dog will be brought into action if and only if, after the completion of the toasting of one slice of bread, another slice should be entered and the carriage quickly depressed before the member 12a has had time to cool and contract sufficiently to bring the primary dog into operative position.

The length of the toasting period made up of sub-intervals (a) and (b) will be determined by the setting of supporting lever or member 55, which is accomplished by adjustments of the screw 56a. For example, the farther the lower end of support 55 is set toward the right in respect to Fig. 4, the greater will be the movement of the tappet lever 56 required to release the tappet and hence the longer the total toasting interval; and the converse of this statement is also true.

What I claim is:
1. In a thermostatic timer, primary and secondary thermally responsive members, means for heating said primary and secondary members consecutively during the same timed interval, automatic means for terminating the heating action on said primary member and applying heat to said secondary timing member when the for- mer has reached a predetermined temperature, and automatic means for rendering said heating means inoperative when said secondary member has reached the predetermined high temperature to thereby terminate the timed interval, and all of which actions take place during the same timed interval.

2. The combination with electrical heating means, of a thermostatic timer for establishing intervals of time of action of said heating means, said timer including primary and secondary expansible and contractable thermally responsive members, means whereby said heating means will act upon said primary timer member only until the latter has reached a predetermined high temperature, automatic means operative when said primary member has reached a predetermined high temperature for interrupting the heating action thereof on said primary member and applying heat to said secondary timer member, and means for terminating the action of said heating means when said secondary member has reached a predetermined high temperature, thereby terminating the action of said heating means, and all of which actions take place during the same timed interval.

3. The combination with electrical heating means, of a timer for establishing intervals of time action of said heating means, said timer including expansible and contractable primary and secondary thermally responsive members equipped with electrical heaters, circuit connections controlling the supply of current to the heaters of said primary and secondary members and including also a master switch and a timer switch, and means whereby when said master switch is closed, the current will be rendered effective to heat said primary member to a predetermined temperature, means whereby said timer switch will be actuated when said primary member has been heated to a predetermined temperature to thereby cut the latter out of action and direct the current to said secondary timer member, and means whereby when said secondary member has been heated to a predetermined temperature, said master switch will be opened and the supply of current to both of said timer members will be cut off, thereby terminating the timed interval.

4. The combination with major heating means, of a thermally responsive timer for establishing intervals of timed action of said heating means, means for simultaneously supplying the heating current to said major heating means and to said timer, said timer including primary and secondary thermally responsive members equipped with electrical heaters, means whereby the current supplied to said major heating means will be primarily rendered effective on the heater of said primary thermally responsive member, means whereby when said primary thermally responsive member has been heated to a predetermined temperature, the heating current will be cut off therefrom and delivered to the heater of said secondary thermally responsive member, and means whereby when said secondary thermally responsive member has been heated to a predetermined temperature, the supply of current to said timer and to said major heating means will be cut off, thereby terminating the timed heating interval.

5. A thermostatic timer comprising primary and secondary thermally responsive members equipped with individual heaters, means for primarily heating said primary timer member, automatic means operative when said primary timer member has been heated to a predetermined temperature to thereby interrupt the supply of heat thereto and cause the heat to be delivered to said secondary timer member, and automatic means for indicating the completion of the timed interval when said secondary timer member has been heated to a predetermined temperature, and all of which actions take place during the same timed interval.

6. A thermostatic timer for establishing intervals of time comprising primary and secondary thermally responsive members equipped with individual heaters, means for primarily heating said primary timer member, automatic means operative as a result of the heating of said primary timer member for interrupting the supply of heat thereto and rendering the supply of heat operative on said secondary timer member, and automatic means operative as a result of heating of the latter for indicating the completion of the timed interval, and all of which actions take place during the same timed interval.

7. A thermally responsive electric timer including primary and secondary thermally responsive members equipped with individual electric heaters, means for supplying current to the electrical heaters of said timer members, co-operating automatic current controlling means actuated by said primary member, when the latter has been heated to a predetermined extent, to switch the current from the electrical heating element of said primary member to the electrical heating element of said secondary member, and automatic means operative to cut off the supply of current to the electrical heating element of said secondary member, when said secondary member has been heated to a predetermined extent, all of which actions take place during the same timed two-step interval.

8. The combination with electrical cooking means, of a thermally responsive electric timer including primary and secondary thermally responsive members equipped with individual electric heaters, means for supplying current to said electrical cooker and to the electrical heaters of said timer members, co-operating automatic current controlling means actuated by said primary member, when the latter has been heated to a predetermined extent, to switch the current from the electrical heating element of said primary member to the electrical heating element of said secondary member, and automatic means operated by said secondary member for cutting off the supply of current to the electrical heating element of said secondary member and to said cooking means, when the secondary member has been heated to a predetermined extent, all of which actions take place during the same timed two-step interval.

9. The combination with electrical cooking means, of a timer for establishing intervals of time action of said heating means, said timer including primary and secondary electrically actuated thermally responsive members equipped with individual electrical heaters, electrical connections between said heating means and timer members including a selectively acting timer switch, a master switch in said electrical connection, and co-operating devices operative when said master switch is closed to direct the current to said electrical heating means and initially to said primary timer member, said primary timer member, when heated to a predetermined temperature, arranged and operative to actuate said timer switch to cut the supply of current from the primary timer member and direct the same to said secondary timer member, and means whereby said secondary timer member when heated to a predetermined temperature, will cause opening of said master switch and termination of the heating interval.

10. In a thermostatic timer, primary and secondary thermally responsive timer members, an electric circuit including electrical heating elements independently associated with said timer members, a three-contact timer switch, two members of which are independently connected to the heating elements of said timer members, and the third of which is movable alternately from engagement with the said first noted two members of said switch, said switch being normally set to direct current to the heating element of said primary timer member, and switch-actuating connections operated by expansion of said primary timer member to actuate said switch and thereby cut off the current supply to the heating element of said primary timer member and to direct the same to the heating element of said secondary timer member.

11. In a thermostatic timer, primary and secondary thermally responsive timer members, an electric circuit including electrical heating elements independently associated with said timer members, a three-contact timer switch, two members of which are independently connected to the heating elements of said timer members, and the third of which is movable alternately from engagement with the said first noted two members of said switch, said switch being normally set to direct current to the heating element of said primary timer member, switch-actuating connections operated by expansion of said primary timer member to actuate said switch and thereby cut off the current supply to the heating element of said primary timer member and to direct the same to the heating element of said secondary timer member, a manually closed master switch in said circuit, and connections whereby expansion of said secondary timer element will open said master switch and terminate the heating interval.

12. The structure defined in claim 10 in which the timer switch-actuating means includes a movable tappet, a latch lever normally holding said tappet in a switch-actuating position which causes initial flow of current to the electrical heating element of said primary timer member, and a releasing lever actuated by expansion of said primary timer member to cause said latch lever to release said tappet, the latter, when released, being operative on said timer switch to direct the current flow from the electrical heating element of said primary timer member to the electrical heating element of said secondary timer member.

13. The structure defined in claim 11 in which said last noted connections include a latch dog operative to hold said master switch in a circuit-closing position, and a latch-releasing lever subject to expansion and contraction of said secondary timer member and operative on said latch dog to release the master switch for circuit-opening movement.

14. The structure defined in claim 11 in which said last noted connections include a latch dog operative to hold said master switch in a circuit-closing position, and a latch-releasing lever subject to expansion and contraction of said secondary timer member and operative on said latch dog to release the master switch for circuit-opening movement, said latch dog being yieldingly under strain to assume an operative position, said latch dog releasing lever having a limited movement in respect to said dog.

15. The structure defined in claim 11 in which said last noted connections include a latch dog operative to hold said master switch in a circuit-closing position, and a latch-releasing lever subject to expansion and contraction of said secondary timer member and operative on said latch dog to release the master switch for circuit-opening movement, said latch dog being yieldingly under strain to assume an operative position, said latch dog releasing lever having a limited movement in respect to said dog, and in further combination with an auxiliary latch dog actuated by the main latch dog and operative to assume an operative position when the main dog is in an inoperative position.

16. In an electric toaster, the combination with electrical heating elements, a supply circuit therefor including a normally open master switch and a master switch actuator, of a thermostatic timer for establishing intervals of the time action of the supply of current to the electrical heating elements of said toaster, said timer including primary and secondary electrically heated expansible and contractible thermally responsive timer members and associated electrical heating elements, means under control of said timer operative when said master switch is closed, initially to direct the current to the electrical heating element of said primary timer member, means controlled by the expansion of said primary timer member to cut off the supply of current to the electrical heating element of said primary member and direct the same to the electrical heating element of said secondary timer member, and means operative under expansion of said secondary timer member to cause opening of the master switch and thereby termination of the toasting interval.

17. The structure defined in claim 16 in which the master switch actuator includes a bread carriage movable to position the bread slice in position for toasting, thereby causing closing of said master switch, and movable when released to project the toast from the toasting zone.

18. In an electric toaster, the combination with electrical heating elements, a supply circuit therefor including a normally open master switch, master switch-actuating means including a bread slice carriage normally under strain to move from a depressed to a toast-ejecting master switch-opening position, a latch for holding said carriage depressed and said master switch closed, a thermally responsive timer comprising primary and secondary expansible and contractible thermally responsive members and associated electrical heating elements, circuit connections including a timer switch for connecting the heating elements of said primary and secondary timer members to the supply circuit, said timer switch being normally set to direct current to the electrical heating element of said primary timer member, when said master switch is closed, means operative by expansion of said primary timer member to cause said timer switch to cut off the supply of current to the electrical heating element thereof and to direct the same to the electrical heating element of said secondary timer member, and means operative by expansion of said secondary timer member to cause said latch to release said carriage and cause opening of said master switch, thereby terminating the toasting interval.

19. The structure defined in claim 18 in which the timer switch actuating means includes a movable tappet, a latch lever normally holding said tappet in a switch-actuating position which causes the flow of current to the electrical heating element of said primary timer member, and a releasing lever actuated by expansion of said primary timer member, to cause said latch lever to release said tappet, the latter, when released, being operative on said timer switch to direct the current flow from the electrical heating element of said primary timer member to the electrical heating element of said secondary timer member.

20. The structure defined in claim 18 in which the timer switch actuating means includes a movable tappet, a latch lever normally holding said tappet in a switch-actuating position which causes the flow of current to the electrical heating element of said primary timer member, and a releasing lever actuated by expansion of said primary timer member, to cause said latch lever to release said tappet, the latter, when released, being operative on said timer switch to direct the current flow from the electrical heating element of said primary timer member to the electrical heating element of said secondary timer member, and in which the means operated by the expansion of the secondary timer member includes a latch dog operative to hold said carriage depressed and said master switch closed, and a latch lever subject to expansion and contraction of said secondary timer member and operative on said latch dog to release said master switch and carriage when said secondary timer member has been heated to a predetermined temperature and expanded to a predetermined extent.

21. The structure defined in claim 18 in which the means operated by the expansion of the secondary timer member includes a latch dog operative to hold said carriage depressed and said master switch closed, and a latch lever subject to expansion and contraction of said secondary timer member and operative on said latch dog to release said master switch and carriage when said secondary timer member has been heated to a predetermined temperature and expanded to a predetermined extent.

22. The combination with cooking means of a thermostatic timer comprising, primary and secondary thermally responsive members, means for heating said primary member to expand the same, means actuated by the expansion of said primary timer member during the same cooking interval to terminate the heating action on said primary member and transfer the heating action to said secondary timer member, to expand the latter, and means actuated by the expansion of said secondary timer member to terminate the cooking interval.

23. The combination with cooking means including a primary heater and an associated holder for the article to be cooked, of a timer for establishing intervals of time action of said primary heater, said timer including primary and secondary thermally responsive members, means for heating said primary and secondary members consecutively during the same timed interval, automatic means for terminating the heating action of said primary timing member and applying heat to said secondary timing member when the former has reached a predetermined temperature, and automatic means for rendering said heating means inoperative when said secondary member has reached a predetermined high temperature and to thereby terminate the timed interval, and all of which actions take place during the same timed interval.

24. The combination with cooking means including a primary electrical heater and an associated holder for the article to be cooked, of a thermostatic timer for establishing intervals of time action of said primary heater, said timer including expansible and contractible primary and secondary thermally responsive members equipped with electrical heaters, circuit connections controlling the supply of current to the heaters of said primary and secondary members and including also a master switch and a timer switch, and means whereby, when said master switch is closed, the current will be rendered effective through the electrical heater of said primary timer member, means whereby said timer switch will be actuated, when said primary timer member has been heated to a predetermined temperature, to thereby cut the heater of said primary timer member out of action and direct the current to the electrical heater of said secondary timer member, and means whereby when said secondary timer member has been heated to a predetermined temperature, said master switch will be opened and the supply of current to both of said timer members will be cut off, thereby terminating the cooking interval.

MAURICE H. GRAHAM.